United States Patent
Snow et al.

(10) Patent No.: US 10,592,539 B1
(45) Date of Patent: Mar. 17, 2020

(54) TRENDS IN A MESSAGING PLATFORM

(71) Applicant: Twitter, Inc., San Francisco, CA (US)

(72) Inventors: Rion Langley Snow, San Francisco, CA (US); Gilad Avraham Mishne, Albany, CA (US)

(73) Assignee: Twitter, Inc., San Francisco, CA (US)

( * ) Notice: Subject to any disclaimer, the term of this patent is extended or adjusted under 35 U.S.C. 154(b) by 224 days.

(21) Appl. No.: 14/329,771

(22) Filed: Jul. 11, 2014

(51) Int. Cl.
*G06F 16/00* (2019.01)
*G06Q 50/00* (2012.01)
*G06F 16/33* (2019.01)
*G06F 16/958* (2019.01)
*G06F 16/34* (2019.01)
(Continued)

(52) U.S. Cl.
CPC ........ *G06F 16/3334* (2019.01); *G06F 16/335* (2019.01); *G06F 16/345* (2019.01); *G06F 16/958* (2019.01); *G06F 16/9535* (2019.01); *G06Q 50/01* (2013.01)

(58) Field of Classification Search
CPC . H04L 12/588; H04L 12/5805; H04L 12/581; H04L 12/5825; H04L 12/586; H04L 12/5865; G06Q 10/10; G06Q 50/01; G06Q 20/00; G06Q 50/04; G06Q 99/00; G06F 17/30864; G06F 17/30867; G06F 17/3053; G06F 17/30861; G06F 17/30613; G06F 17/30873; G06F 17/3089; G06F 17/30672; G06F 17/30646; G06F 17/30699; G06F 17/30616; G06F 16/9535; G06F 16/285; G06F 16/3322; G06F 16/951; G06F 16/2237; G06F 16/9024; G06F 16/313; G06F 16/319; G06F 16/3334; G06F 16/335; G06F 16/345; G06F 16/958; G06D 10/10; G06D 50/01; G06D 20/00; G06D 50/04; G06D 99/00
See application file for complete search history.

(56) References Cited

U.S. PATENT DOCUMENTS 6,981,040 B1 * 12/2005 Konig .................... H04L 67/20
7,181,438 B1 2/2007 Szabo
(Continued)

OTHER PUBLICATIONS

Zhongming Ma, et al., "Interest-Based Personalized Search",ACM Transactions on Information Systems, vol. 25, No. 1, Article 5, Publication date: Feb. 2007, pp. 1-38.*
(Continued)

*Primary Examiner* — Srirama Channavajjala
(74) *Attorney, Agent, or Firm* — Fish & Richardson P.C.

(57) ABSTRACT

A method of operating a messaging platform, including: obtaining, for a first profile, a first and a second topic of interest, a first intra-profile (IP) weight for the first topic of interest, and a second IP weight for the second topic of interest; obtaining a first plurality of trending entities for the first topic and a first plurality of intra-topic (IT) weights for the first plurality of trending entities; obtaining a second plurality of trending entities for the second topic and a second plurality of IT weights for the second plurality of trending entities; selecting a subset of the first plurality of trending entities and the second plurality of trending entities based on the first IP weight, the second IP weight, the first plurality of IT weights, and the second plurality of IT weights; and sending content associated with the subset for display to a user of the first profile.

20 Claims, 8 Drawing Sheets

(51) Int. Cl.
  *G06F 16/9535* (2019.01)
  *G06F 16/335* (2019.01)

(56) References Cited

U.S. PATENT DOCUMENTS

| | | |
|---|---|---|
| 7,275,061 B1 | 9/2007 | Kon |
| 8,122,031 B1* | 2/2012 | Mauro .................. G06F 16/355 707/748 |
| 8,243,988 B1 | 8/2012 | Buddenneier |
| 8,306,922 B1 | 11/2012 | Kunal et al. |
| 8,355,998 B1 | 1/2013 | Avelbuch |
| 8,380,803 B1 | 2/2013 | Stibel et al. |
| 8,494,897 B1 | 7/2013 | Dawson |
| 8,655,938 B1 | 2/2014 | Smith et al. |
| 8,676,875 B1 | 3/2014 | Smith et al. |
| 8,762,302 B1 | 6/2014 | Spivack et al. |
| 8,782,033 B2 | 7/2014 | Jiang |
| 8,990,097 B2 | 3/2015 | Spivack et al. |
| 8,996,625 B1 | 3/2015 | Singleton et al. |
| 9,129,227 B1* | 9/2015 | Yee ........................ G06F 16/335 |
| 9,152,703 B1 | 10/2015 | Satish |
| 9,262,537 B2 | 2/2016 | Kim et al. |
| 9,269,081 B1 | 2/2016 | Panzer |
| 9,299,060 B2 | 3/2016 | Panzer |
| 9,305,084 B1 | 4/2016 | McCann |
| 9,336,302 B1 | 5/2016 | Swanny |
| 9,361,322 B1 | 6/2016 | Dutta et al. |
| 9,386,107 B1 | 7/2016 | Browning et al. |
| 9,519,936 B2 | 12/2016 | Vijayaraghavan et al. |
| 9,552,399 B1 | 1/2017 | Browning et al. |
| 9,589,048 B2 | 3/2017 | Milton et al. |
| 9,646,027 B2 | 5/2017 | Zuckerberg et al. |
| 9,832,154 B2 | 11/2017 | Averbuch |
| 1,000,356 A1 | 6/2018 | Perkins et al. |
| 1,006,800 A1 | 9/2018 | Indukuri |
| 10,282,483 B2* | 5/2019 | Hazra .................... G06Q 50/01 |
| 2002/0062368 A1 | 5/2002 | Holtzman et al. |
| 2003/0033333 A1* | 2/2003 | Nishino ............ G06F 17/30884 715/255 |
| 2003/0073473 A1* | 4/2003 | Mori ...................... A63F 13/10 463/6 |
| 2003/0097352 A1 | 5/2003 | Gutta |
| 2003/0097353 A1 | 5/2003 | Gutta |
| 2003/0140309 A1* | 7/2003 | Saito ................ G06F 17/30616 715/259 |
| 2004/0090472 A1 | 5/2004 | Risch |
| 2004/0107221 A1 | 6/2004 | Trepess |
| 2004/0139067 A1 | 7/2004 | Houle |
| 2004/0249700 A1* | 12/2004 | Gross .................... G06Q 30/02 705/7.31 |
| 2004/0249713 A1 | 12/2004 | Gross |
| 2005/0071328 A1* | 3/2005 | Lawrence ........... G06F 17/3053 |
| 2005/0071741 A1* | 3/2005 | Acharya ........... G06F 17/30864 715/208 |
| 2005/0165753 A1* | 7/2005 | Chen .................. G06F 16/9535 |
| 2005/0198056 A1* | 9/2005 | Dumais ............... G06F 16/9535 |
| 2005/0246358 A1 | 11/2005 | Gross |
| 2006/0004704 A1 | 1/2006 | Gross |
| 2006/0010029 A1 | 1/2006 | Gross |
| 2006/0026152 A1 | 2/2006 | Zeng |
| 2006/0036591 A1 | 2/2006 | Gerasoulis |
| 2006/0036685 A1 | 2/2006 | Canning et al. |
| 2006/0080161 A1 | 4/2006 | Arnett et al. |
| 2007/0112754 A1 | 5/2007 | Haigh |
| 2007/0271265 A1 | 11/2007 | Acharya |
| 2007/0271266 A1 | 11/2007 | Acharya |
| 2007/0271278 A1 | 11/2007 | Acharya |
| 2007/0271279 A1 | 11/2007 | Acharya |
| 2007/0271292 A1 | 11/2007 | Acharya |
| 2007/0288503 A1 | 12/2007 | Taylor |
| 2008/0065659 A1* | 3/2008 | Watanabe ......... G06F 17/30997 |
| 2008/0243638 A1 | 10/2008 | Chan |
| 2008/0243815 A1 | 10/2008 | Chan |
| 2008/0281915 A1 | 11/2008 | Elad |
| 2008/0313135 A1 | 12/2008 | Alexe |
| 2009/0030897 A1 | 1/2009 | Hatami-Hanza |
| 2009/0089372 A1 | 4/2009 | Sacco |
| 2009/0125321 A1 | 5/2009 | Charlebois et al. |
| 2009/0144377 A1 | 6/2009 | Kim et al. |
| 2009/0177484 A1 | 7/2009 | Davis et al. |
| 2009/0177644 A1 | 7/2009 | Martinez et al. |
| 2009/0234688 A1 | 9/2009 | Masuyama |
| 2010/0121849 A1 | 5/2010 | Goeldi |
| 2010/0169327 A1 | 7/2010 | Lindsay et al. |
| 2010/0205541 A1* | 8/2010 | Rapaport ............... G06Q 10/10 715/753 |
| 2010/0217763 A1 | 8/2010 | Park |
| 2010/0223341 A1* | 9/2010 | Manolescu ............ H04L 51/32 709/206 |
| 2010/0228777 A1 | 9/2010 | Imig |
| 2010/0312769 A1 | 12/2010 | Bailey |
| 2011/0004831 A1 | 1/2011 | Steinberg |
| 2011/0047161 A1* | 2/2011 | Myaeng .............. G06F 16/3338 707/740 |
| 2011/0055379 A1 | 3/2011 | Lin et al. |
| 2011/0058101 A1 | 3/2011 | Earley et al. |
| 2011/0072052 A1 | 3/2011 | Skarin |
| 2011/0078156 A1 | 3/2011 | Koss |
| 2011/0078188 A1 | 3/2011 | Li et al. |
| 2011/0099351 A1 | 4/2011 | Condict |
| 2011/0106621 A1 | 5/2011 | Pradeep |
| 2011/0161076 A1 | 6/2011 | Davis et al. |
| 2011/0161270 A1 | 6/2011 | Arnett et al. |
| 2011/0173264 A1 | 7/2011 | Kelly |
| 2011/0179084 A1 | 7/2011 | Waddington |
| 2011/0320715 A1 | 12/2011 | Ickman |
| 2012/0005224 A1 | 1/2012 | Ahrens |
| 2012/0042263 A1 | 2/2012 | Rapaport et al. |
| 2012/0089681 A1 | 4/2012 | Chowdhury et al. |
| 2012/0124073 A1 | 5/2012 | Gross |
| 2012/0143996 A1 | 6/2012 | Liebald et al. |
| 2012/0150772 A1 | 6/2012 | Paek et al. |
| 2012/0179764 A1 | 7/2012 | Erdal |
| 2012/0221638 A1 | 8/2012 | Edamadaka et al. |
| 2012/0239694 A1 | 9/2012 | Avner |
| 2012/0254074 A1 | 10/2012 | Flinn |
| 2012/0254099 A1 | 10/2012 | Flinn et al. |
| 2012/0272160 A1 | 10/2012 | Spivack |
| 2012/0278314 A1 | 11/2012 | Sundaresan |
| 2012/0290950 A1* | 11/2012 | Rapaport ................ H04L 51/32 715/753 |
| 2012/0296920 A1 | 11/2012 | Sahni et al. |
| 2012/0296967 A1 | 11/2012 | Tao et al. |
| 2012/0323828 A1* | 12/2012 | Sontag ............ G06F 17/30011 706/12 |
| 2013/0013601 A1 | 1/2013 | Kabiljo |
| 2013/0018957 A1 | 1/2013 | Parnaby et al. |
| 2013/0031094 A1 | 1/2013 | Kozak |
| 2013/0073336 A1* | 3/2013 | Heath ..................... G06Q 30/02 705/7.29 |
| 2013/0091217 A1 | 4/2013 | Schneider |
| 2013/0159106 A1 | 6/2013 | Gross |
| 2013/0205215 A1 | 8/2013 | Dunn et al. |
| 2013/0232263 A1 | 9/2013 | Kelly |
| 2013/0275527 A1 | 10/2013 | Deurloo |
| 2013/0290317 A1 | 10/2013 | Spivack |
| 2013/0297543 A1 | 11/2013 | Treiser |
| 2013/0297689 A1 | 11/2013 | Bhat et al. |
| 2013/0298038 A1* | 11/2013 | Spivack ................ H04L 65/403 715/753 |
| 2013/0311329 A1 | 11/2013 | Knudson |
| 2013/0346172 A1 | 12/2013 | Wu |
| 2014/0019443 A1 | 1/2014 | Golshan |
| 2014/0019548 A1 | 1/2014 | Rafsky et al. |
| 2014/0025734 A1 | 1/2014 | Griffin |
| 2014/0040387 A1 | 2/2014 | Spivack |
| 2014/0052782 A1 | 2/2014 | Ryan et al. |
| 2014/0074856 A1* | 3/2014 | Rao ........................ G06Q 50/01 707/748 |
| 2014/0075004 A1 | 3/2014 | Van Dusen et al. |
| 2014/0082072 A1 | 3/2014 | Kass |
| 2014/0108393 A1 | 4/2014 | Angwin |
| 2014/0114978 A1 | 4/2014 | Chatterjee et al. |

(56) References Cited

U.S. PATENT DOCUMENTS

| | | |
|---|---|---|
| 2014/0129331 A1 | 5/2014 | Spivack et al. |
| 2014/0129625 A1 | 5/2014 | Haugen et al. |
| 2014/0136521 A1 | 5/2014 | Pappas |
| 2014/0156673 A1 | 6/2014 | Mehta |
| 2014/0162241 A1 | 6/2014 | Morgia |
| 2014/0172427 A1 | 6/2014 | Liu et al. |
| 2014/0172751 A1 | 6/2014 | Greenwood |
| 2014/0180788 A1 | 6/2014 | George |
| 2014/0188880 A1 | 7/2014 | Abhyanker |
| 2014/0189022 A1 | 7/2014 | Strumwasser |
| 2014/0201292 A1 | 7/2014 | Savage |
| 2014/0236953 A1* | 8/2014 | Rapaport ............... G06Q 10/10 707/740 |
| 2014/0244614 A1 | 8/2014 | Mei |
| 2014/0258198 A1 | 9/2014 | Spivack |
| 2014/0279757 A1 | 9/2014 | Shimanovsky |
| 2014/0280236 A1 | 9/2014 | Faller |
| 2014/0289231 A1 | 9/2014 | Palmert |
| 2014/0317696 A1 | 10/2014 | Abhyanker |
| 2014/0324966 A1 | 10/2014 | Farnham |
| 2014/0324982 A1 | 10/2014 | Agrawal et al. |
| 2014/0358929 A1 | 12/2014 | Bailey |
| 2014/0365460 A1* | 12/2014 | Portnoy ................ G06F 16/958 707/710 |
| 2014/0366052 A1 | 12/2014 | Ives |
| 2014/0366068 A1 | 12/2014 | Burkitt et al. |
| 2014/0379729 A1 | 12/2014 | Savage et al. |
| 2015/0012419 A1 | 1/2015 | Lawler |
| 2015/0026260 A1 | 1/2015 | Worthley |
| 2015/0089409 A1 | 3/2015 | Asseily |
| 2015/0100425 A1 | 4/2015 | Gross |
| 2015/0120661 A1 | 4/2015 | Keebler |
| 2015/0120717 A1 | 4/2015 | Kim et al. |
| 2015/0170296 A1 | 6/2015 | Kautz |
| 2015/0193508 A1 | 7/2015 | Christensen |
| 2015/0199770 A1 | 7/2015 | Wallenstein |
| 2015/0220510 A1 | 8/2015 | Alba et al. |
| 2015/0220643 A1 | 8/2015 | Alba et al. |
| 2015/0220852 A1 | 8/2015 | Hatami-Hanza |
| 2015/0227624 A1 | 8/2015 | Busch |
| 2015/0236998 A1 | 8/2015 | Verman |
| 2015/0248222 A1* | 9/2015 | Stickler ................ G06Q 10/06 715/763 |
| 2015/0248476 A1 | 9/2015 | Weissinger et al. |
| 2015/0261806 A1 | 9/2015 | Sanchez et al. |
| 2015/0286953 A1 | 10/2015 | Papadopoullos |
| 2015/0310018 A1 | 10/2015 | Fan |
| 2015/0347576 A1* | 12/2015 | Endert ................ G06F 16/345 707/724 |
| 2016/0012454 A1 | 1/2016 | Newton |
| 2016/0034712 A1 | 2/2016 | Patton |
| 2016/0048556 A1 | 2/2016 | Kelly |
| 2016/0055164 A1 | 2/2016 | Cantarero et al. |
| 2016/0359993 A1 | 12/2016 | Hendrickson et al. |
| 2017/0255536 A1 | 9/2017 | Weissinger et al. |
| 2017/0300597 A1 | 10/2017 | Moronnisato et al. |
| 2018/0089311 A1 | 3/2018 | Soni et al. |
| 2018/0114238 A1 | 4/2018 | Treiser |
| 2018/0293607 A1 | 10/2018 | Huddleston et al. |
| 2019/0026786 A1 | 1/2019 | Khoury et al. |

OTHER PUBLICATIONS

Ido Guy et al., "Mining Expertise and Interests from Social Media", ACM,WWW 2013, May 13-17, 2013, Rio de Janiero, Brazil, pp. 1-11.*

Fabian Abel et al., "Analyzing Temporal Dynamics in Twitter Profiles forPersonalized Recommendations in the Social Web", http://techcrunch.com, Jun. 8, 2010, pp. 1-8.*

* cited by examiner

TRENDS IN A MESSAGING PLATFORM

BACKGROUND

Within a messaging platform, messages regarding all sorts of topics may be exchanged between users. Exposing a user to all of the messages would likely overwhelm the user and make it nearly impossible for the user to find content that is of interest to the user.

SUMMARY

In general, in one aspect, the invention relates to a method of operating a messaging platform. The method comprises: obtaining, for a first profile of the messaging platform, a first topic of interest, a first intra-profile (IP) weight for the first topic of interest, a second topic of interest, and a second IP weight for the second topic of interest; obtaining a first plurality of trending entities for the first topic and a first plurality of intra-topic (IT) weights for the first plurality of trending entities; obtaining a second plurality of trending entities for the second topic and a second plurality of IT weights for the second plurality of trending entities; selecting a subset of the first plurality of trending entities and the second plurality of trending entities based on the first IP weight, the second IP weight, the first plurality of IT weights, and the second plurality of IT weights; and sending content associated with the subset for display to a user of the first profile.

In general, in one aspect, the invention relates to a messaging platform system. The messaging platform comprises: a processor; a topic repository storing: a first topic and a first profile known for a first topic and a second topic; and a second topic and a second profile known for the second topic; a trends repository storing: a first plurality of trending entities for the first topic and a first plurality of intra-topic (IT) weights for the first plurality of trending entities; and a second plurality of trending entities for the second topic and a second plurality of IT weights for the second plurality of trending entities; a connection graph identifying a third profile following the first profile and following the second profile; and a trends personalization engine executing on the processor and configured to: determine, by accessing the topic repository, that the third profile is interested in the first topic and the second topic in response to the third profile following the first profile and the second profile; obtain, for the third profile, a first intra-profile (IP) weight for the first topic and a second IP weight for the second topic; select, for the third profile, a subset of the first plurality of trending entities and the second plurality of trending entities based on the first IP weight, the second IP weight, the first plurality of IT weights, and the second plurality of IT weights; and send content associated with the subset for display to a user of the third profile.

In general, in one aspect, the invention relates to a non-transitory computer readable medium (CRM) storing a plurality of instructions for operating a messaging platform. The instructions comprise functionality for: obtaining, for a first profile of the messaging platform, a first topic of interest, a first intra-profile (IP) weight for the first topic of interest, a second topic of interest, and a second IP weight for the second topic of interest; obtaining a first plurality of trending entities for the first topic and a first plurality of intra-topic (IT) weights for the first plurality of trending entities; obtaining a second plurality of trending entities for the second topic and a second plurality of IT weights for the second plurality of trending entities; selecting a subset of the first plurality of trending entities and the second plurality of trending entities based on the first IP weight, the second IP weight, the first plurality of IT weights, and the second plurality of IT weights; and sending content associated with the subset for display to a user of the first profile.

Other aspects of the invention will be apparent from the following description and the appended claims.

DETAILED DESCRIPTION

Figure 1:
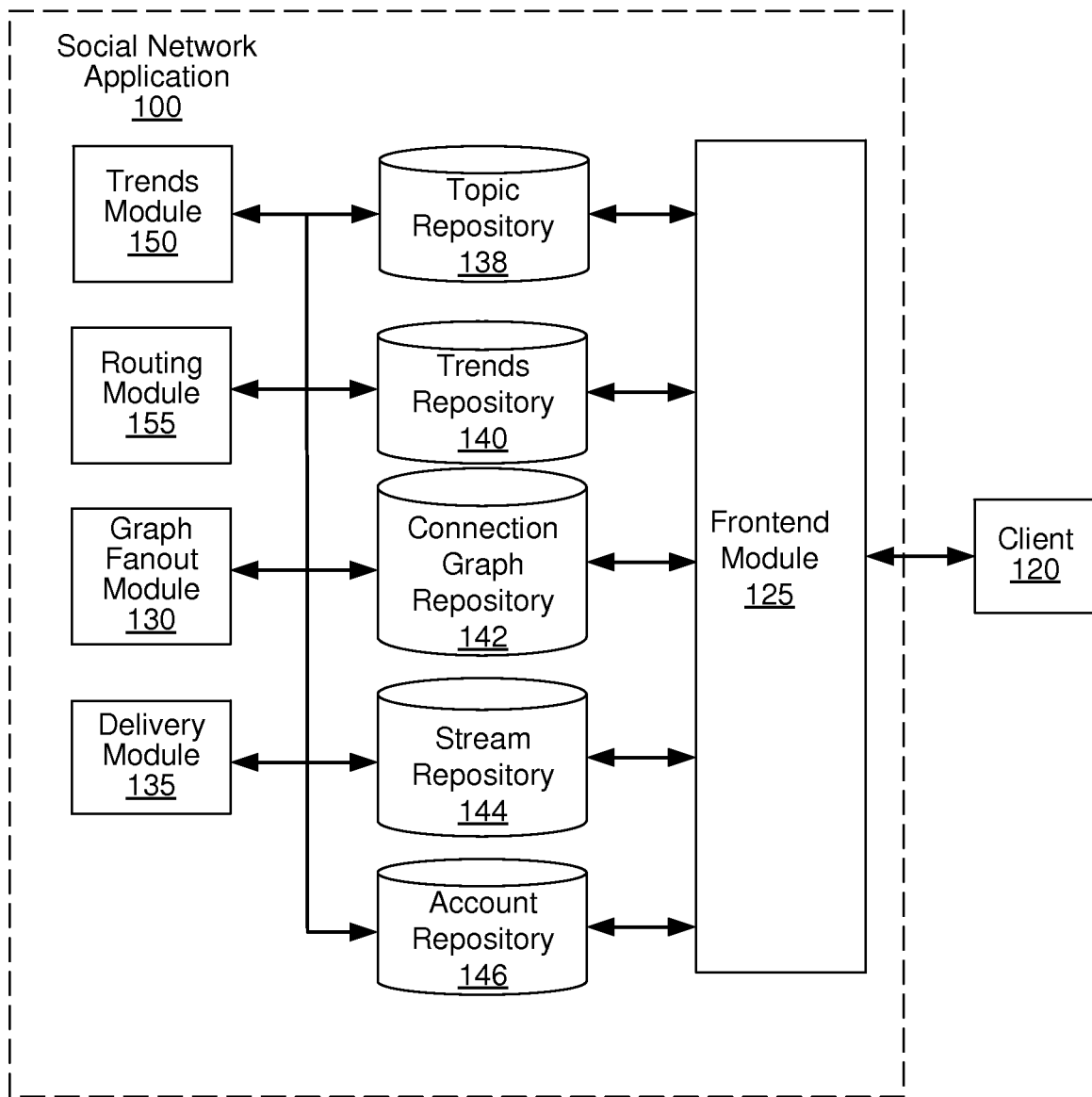
FIGS. 1-3 show schematic diagrams in accordance with one or more embodiments of the invention.
Figure 2:
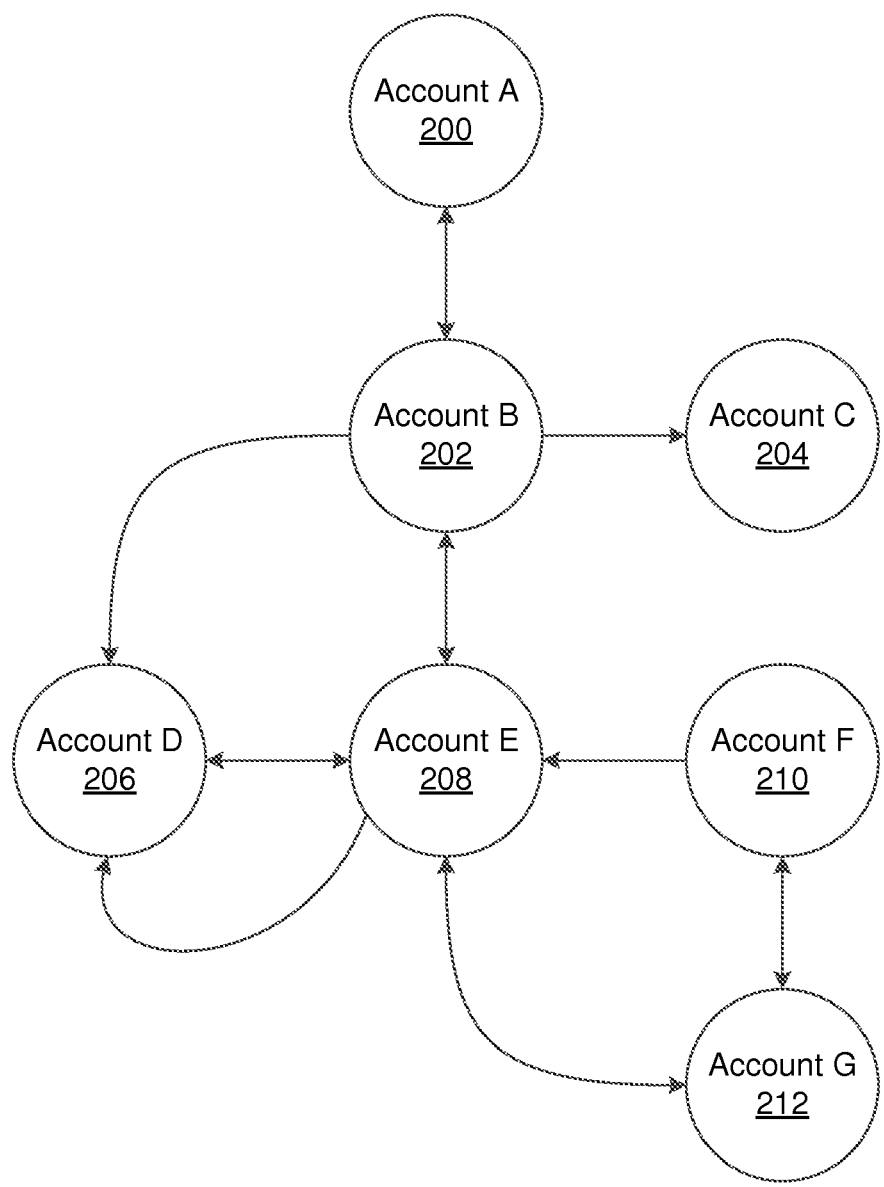

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a messaging platform system, a method for operating a messaging platform, and a non-transitory computer readable medium storing instructions for operating a messaging platform. Within the messaging platform, topics of interest and trending entities within the topics of interest are identified for a profile. Then content (e.g., messages, images, links to images and/or news stories, etc.) associated with the identified trending entities is retrieved and sent for display to a user of the profile.

FIG. 1 shows a schematic diagram of a system in accordance with one or more embodiments of the invention. Specifically, FIG. 1 shows a social network application (100) and a client (120) in accordance with one or more embodiments of the invention. The social network application (100) may also be referred to as a messaging platform in accordance with one or more embodiments of the invention.

A social network application (100) connects users to other users (i.e., clients) of the social network application (100), exchanges social networking messages between connected users of the social network application (100), and provides an interface for a user to create and view social network messages. In one or more embodiments of the invention, social network messages are broadcast social networking messages that are transmitted to at least a set of users. The users in the set may be self-selected (e.g., followers of the transmitting user) or users that satisfy a certain status with the transmitting user (e.g., belong to a group, friend, family, etc.). The social networking messages may include, for example, a comment from a user on a document, personal status update, a reference to a document, and other information.

Further, in one or more embodiments of the invention, the social networking application (100) includes functionality to receive an original reference from a user for a document, generate a social network reference from the original reference, and transmit the social network reference to other users. Thus, a user may share the document via the social network application (100) by sending a message containing a reference to the document to other users or posting a social network reference to the document. In one or more embodiments of the invention, the original reference is a reference to the location of the published document, such as a uniform resource locator (URL) of a web page. The social network reference is an indirect reference to the location of the published document. The social network application may be configured to perform analytics on the engagement of the social network reference and/or shorten the original reference. For example, the social network reference and the original reference may be a hypertext transfer protocol link or another mechanism for referencing the location of a document.

As shown in FIG. 1, the social network application (100) has multiple components including a trends module (150), a machine learning module (not shown), a topic repository (138), a frontend module (125), a routing module (155), a graph fanout module (130), a delivery module (135), a trends repository (140), a connection graph repository (142), a stream repository (144), and an account repository (146). Various components of the social network application (100) (e.g., trends module (150)) may be located on the same hardware device (e.g., a server, mainframe, desktop Personal Computer (PC), laptop, Personal Digital Assistant (PDA), telephone, mobile phone, kiosk, cable box) or may be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, the social network application (100) is a platform for facilitating real-time communication between one or more entities. For example, the social network application (100) may store millions of accounts of individuals, businesses, and/or other entities (e.g., pseudonym accounts, novelty accounts, etc.). One or more users of each account may use the social network application (100) to send social networking messages to other accounts inside and/or outside of the social network application (100). In one or more embodiments of the invention, an account is referred to as a profile. The social network application (100) may be configured to enable users to communicate in "real-time", i.e., to converse with other users with a minimal delay and to conduct a conversation with one or more other users during simultaneous sessions. In other words, the social network application (100) may allow a user to broadcast social networking messages and may display the social networking messages to one or more other users within a reasonable time frame so as to facilitate a live conversation between the users. Recipients of a social networking message may have a predefined graph relationship with an account of the user broadcasting the social networking message. In one or more embodiments of the invention, the user is not an account holder or is not logged in to an account of the social network application (100). In this case, the social network application (100) may be configured to allow the user to broadcast social networking messages and/or to utilize other functionality of the social network application (100) by associating the user with a temporary account or identifier.

In one or more embodiments of the invention, the connection graph repository (142) is configured to store one or more connection graphs. FIG. 1B shows an example depiction of a connection graph (299) in accordance with one or more embodiments of the invention. As shown in FIG. 1B, the connection graph (299) has multiple components including nodes representing accounts of the social network application (100) (i.e., Account A (200), Account B (202), Account C (204), Account D (206), Account E (208), Account F (210), Account G (212)) and edges connecting the various nodes. In one or more embodiments of the invention, an account is also referred to as a profile.

The connection graph (299) is a data structure representing relationships (i.e., connections) between one or more accounts. The connection graph (299) represents accounts as nodes and relationships as edges connecting one or more nodes. A relationship may refer to any association between the accounts (e.g., following, friending, subscribing, tracking, liking, tagging, and/or etc.). The edges of the connection graph (299) may be directed and/or undirected based on the type of relationship (e.g., bidirectional, unidirectional), in accordance with various embodiments of the invention.

Returning to FIG. 1, in one or more embodiments of the invention, the routing module (155) includes functionality to receive one or more social networking messages, to assign an identifier to the social networking message, and to notify the graph fanout module (130) of a sender of the social networking message.

In one or more embodiments of the invention, the graph fanout module (130) includes functionality to retrieve graph data from the connection graph repository (142) and to use the graph data to determine which accounts in the social network application (100) should receive the social networking message. The graph data, for example, may reflect which accounts in the social network application are "following" a particular account and are, therefore, subscribed to receive status social networking messages from the particular account.

In one or more embodiments of the invention, the delivery module (135) includes functionality to receive a list of accounts from the graph fanout module (130) and the message identifier generated by the routing module (155) and to insert the message identifier into stream data associated with each identified account. The delivery module (135) may then store the message list in the stream repository (144). The stream data stored in the stream repository (144) may make up one or more streams associated with one or more accounts of the social network application (100). A stream may be a dynamic list of social networking messages associated with one or more accounts or may reflect any arbitrary organization of social networking messages that is advantageous for the user of an account.

In one or more embodiments of the invention, the frontend module (125) is a software application or a set of related software applications configured to communicate with external entities (e.g., client (120)). The frontend module (125) may include the application programming interface (API) and/or any number of other components used for communicating with entities outside of the social network application (100). The API may include any number of specifications for making requests from and/or providing data to the social network application (100). For example, a function provided by the API may provide artist/song recommendations to a requesting client (105).

In one or more embodiments of the invention, the frontend module (125) is configured to use one or more of the data repositories (topic repository (138), trends repository (140), connection graph repository (142), stream repository (144), and/or account repository (146)) to define streams for serving social networking messages (i.e., stream data) to a user of the account on the social network application (100). A user may use any client (120) to receive the social networking messages. For example, where the user uses a web-based client to access the social network application (100), an API of the frontend module (125) may be utilized to define one or more streams and/or to serve the stream data to the client for presentation to the user. Similarly, different forms of message delivery may be handled by different modules in the frontend module (125). In one or more embodiments of the invention, the user may specify particular receipt preferences, which are implemented by the frontend module (125).

In one or more embodiments of the invention, one or more of the data repositories (topic repository (138), trends repository (140), connection graph repository (142), stream repository (144), account repository (146)) is a database and/or storage service residing on one or more servers. For example, one or more of the data repositories may be implemented as a storage service using service-oriented architecture (SOA) and configured to receive requests for data and to provide requested data to other components of the social network application (100). In another example, the topic repository (138) may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

In one or more embodiments of the invention, one or more of the data repositories (topic repository (138), trends repository (140), connection graph repository (142), stream repository (144), account repository (146)) is a separate application or set of applications residing on one or more servers external (and communicatively coupled) to the social network application (100). Alternatively, in one or more embodiments of the invention, one or more of the data repositories may be an integrated component of the social network application (100) and/or may reside, either partially or entirely, on one or more common hardware devices (e.g., a server).

In one or more embodiments of the invention, the topic repository (138) includes functionality to store social networking messages and social networking messages metadata. The social networking messages metadata may include an identifier of the originating user of the social networking message, a list of users that received the social networking message, a number of users that received the social networking message, statistics (e.g., a ratio of connected users to the originating user that forward the social networking message versus disconnected users to the originating user that forward the social networking message), time and date in which the social networking message is transmitted, and other information. The topic repository (138) is discussed below in reference to FIG. 3.

In one or more embodiments of the invention, the account repository (146) stores the mappings between profiles and topics that are of interest to each profile. An almost unlimited number of different topics may exist. Football, politics, patent law, technology, theology, San Francisco, classical music, Canada, etc. are all examples of topics. The account repository (146) may also store intra-profile weights for each topic of interest within a profile. An intra-profile weight is effectively a measurement as to the degree of interest the profile has in a specific topic. The larger the intra-profile weight, the greater the interest in the topic. For example, Profile A (not shown) may be interested in the topic of politics with an intra-profile weight of 0.76, and may be interested in the topic of technology with an intra-profile weight of 0.2. As another example, Profile B (not shown) may be interested in the topic of hockey with an intra-profile weight of 0.6, and the topic of Canada with an intra-profile weight of 0.4.

Figure 3:
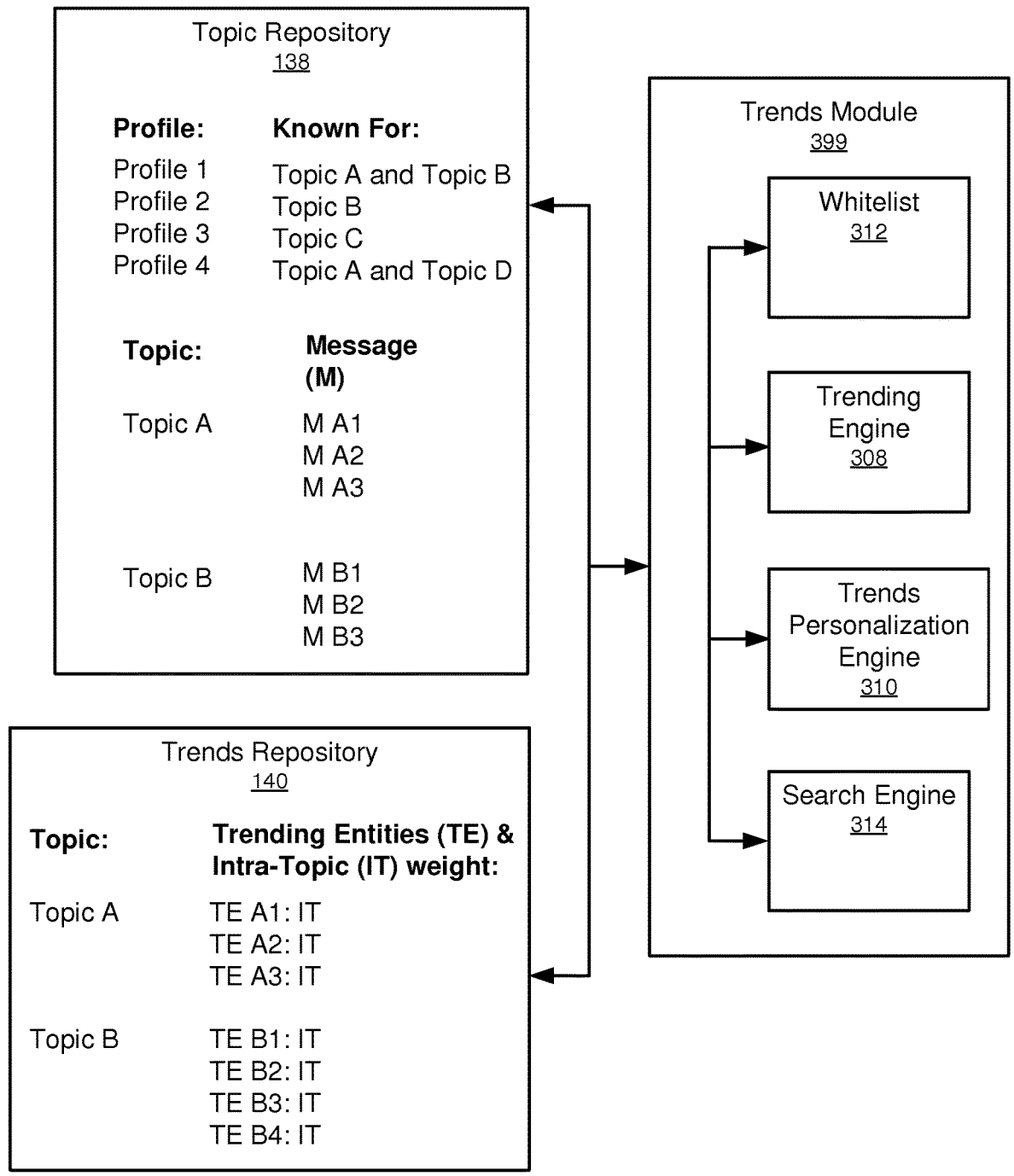

FIG. 3 shows a schematic diagram of a system in accordance with one or more embodiments of the invention. Specifically, FIG. 3 shows a more detailed diagram of the trends module (150) in the social network application (100). In other words, the trends module (399) in FIG. 3 is essentially the same as the trends module (150) in FIG. 1.

Continuing with FIG. 3, the trends module (399) is a component that includes functionality to identify trending entities within a variety of topics, to identify one or more topics of interest to a profile (i.e., account), and to retrieve content related to one or more trending entities within the topics of interest to the profile. The content may correspond to messages (e.g., issued by other profiles), news stories, images, links to web sites, etc.

As shown in FIG. 3, the trends module (399) is connected to the topic repository (138) (also discussed above in reference to FIG. 1). The topic repository (138) may correspond to a list, an array, a database, a flat file, or a data structure of any type. The topic repository (138) stores mappings between multiple profiles (i.e., accounts) and the topic(s) each of the profiles is known for. As shown in FIG. 3, Profile 1 is known for Topic A and Topic B. Profile 2 is known for Topic B, while Profile 3 is known for Topic C. Further, Profile 4 is known for Topic A and Topic D. As discussed above, the social networking application (100) may have many profiles. However, only some of the profiles are known for issuing messages regarding one or more topics. As discussed above, there exists an almost unlimited number of different topics.

In one or more embodiments of the invention, the topic repository (138) also stores an expert weight for each topic a profile is known for. The expert weight is effectively a measurement as to what degree the profile is known for the topic. For example, in FIG. 3, the topic repository (138) may store for Profile 4 an expert weight of 0.9 for Topic A and an expert weight of 0.2 for Topic D. In this example, Profile 4 is very well known for Topic A, while less well known for Topic D.

As shown in FIG. 3, the trends module (399) is connected to the trends repository (140) (also discussed above in reference to FIG. 1). The trends repository (140) may correspond to a list, an array, a database, a flat file, or a data structure of any type. The trends repository (140) stores topics, trending entities (TEs) within each topic, and intra-topic weights for each trending entity. As shown in FIG. 3, there are three trending entities for Topic A: TE A1, TE A2, and TE A3; and four trending entities for Topic B: TE B1, TE B2, TE B3, and TE B4. Each of the trending entities has an intra-topic (IT) weight. The larger the intra-topic weight, the more trending the entity is within its topic. For example, Topic A may be politics, and TE A1 may be the Democratic National Convention, TE A2 may be the National Security Agency (NSA), and TE A3 may be House Bill No. XYZ. These trending entities may have intra-topics weights of 0.8, 0.4, and 0.1, respectively, within the topic of politics.

In one or more embodiments of the invention, the trends module (399) includes a trends personalization engine (310). The trends personalization engine (310) may correspond to any combination of hardware and software that is configured to: determine the topics of interest for a profile; obtain intra-profile weights for the topics of interest for the profile; select some of the trending entities in the topics of interest based on intra-profile weights and intra-topic weights; filter one or more of the trending entities based on attributes of the selected profile; and send content associated with the selected trending entities for display to a user of the profile. Each of these functions is discussed below.

In one or more embodiments, the trends personalization engine (310) is configured to determine the topics of interest for a selected profile. As discussed above, the connection graph (299) is a data structure representing relationships (i.e., connections) between one or more profiles (i.e., accounts). By accessing/traversing the connection graph (299), the trends personalization engine (310) may discover profiles that the selected profile follows. As also discussed above, the topic repository (138) stores the mappings between profiles and the topic(s) each profile is known for. By accessing the topic repository (138), the trends personalization engine (310) may determine the topic(s) that the discovered profiles are known for. The trends personalization engine (310) may then designate these topics as topics of interest for the selected profile.

For example, assume profile X follows both profile Y and profile Z. This "follows" relationship between profile X, profile Y, and profile Z may be determined by accessing/traversing the connection graph (299). Moreover, assume that profile Y is known for the topic of politics and profile Z is known for the topics of football and politics. The topic(s) each of the discovered profiles (i.e., profile Y, profile Z) is known for may be determined my accessing the topic repository (138). As profile X follows profile Y and profile Z, and as profile Y and profile Z are known for politics and football, the trends personalization engine (310) determines that profile X is interested in politics and football. In other words, politics and football are topics of interest for profile X because profile X follows profiles (i.e., profile Y and profile Z) that are known for the topics of football and politics. Once the topics of interest for a profile have been discovered, this information may be stored in the account repository (146) (discussed above in reference to FIG. 1).

In one or more embodiments of the invention, the trends personalization engine (310) is configured to obtain intra-profile weights for the topics of interest for a selected profile. The intra-profile weight for a topic of interest for a selected profile may be calculated based on numerous factors including: the number of profiles followed by the selected profile that are known for the topic of interest; the expert weight each followed profile has for the topic of interest; the number of messages associated with the topic of interest that are issued or forwarded by the selected profile, etc. The intra-profile weights for the topics of interest may be stored in the account repository (146) (discussed above). For example, it may be determined that a selected profile is interested in the topic of politics with an intra-profile weight of 0.8, and is interested in the topic of patent law with an intra-profile weight of 0.2.

In one or more embodiments of the invention, the trends personalization engine (310) is configured to select some of the trending entities in the topics of interest for the selected profile based on intra-profile weights and intra-topic weights. As discussed above, the trends repository (140) stores trending entities for each topic, and the intra-topic weight within the topic for each trending entity. The larger the intra-topic weight, the more trending the entity is within the topic. Once the topics of interest and the intra-profile weights for the topics of interest for a selected profile are determined/obtained, a subset of the trending entities in the topics of interest may be selected.

In one or more embodiments of the invention, selecting a subset of the trending entities includes multiplying the intra-profile weight for the topic of interest with the intra-topic weight of each trending entity within the topic of interest. This is done for all topics of interest for the selected profile. The products resulting from these multiplications are compared with a predetermined threshold. The trending entities having products that satisfy (e.g., equal or exceed) the predetermined threshold are selected for inclusion in the subset.

For example, assume the selected profile is interested in the topic of politics with an intra-profile weight of 0.42, and the topic of football with an intra-profile weight of 0.58. Further, assume the trending entities within the topic of politics are the Democratic National Convention with an intra-topic weight of 0.76, the National Security Agency (NSA) with an intra-topic weight of 0.48, and House Bill XYZ with an intra-topic weight of 0.22. Further still, assume the trending entities within the topic of football are the Super Bowl with an intra-topic weight of 0.81, team A with an intra-topic weight of 0.3, and player Q with an intra-topic weight of 0.28. With respect to the topic of politics, the resulting products are 0.32 for Democratic National Convention ($0.32=0.42\times0.76$), 0.20 for NSA ($0.20=0.42\times0.48$), and 0.09 for House Bill XYZ ($0.09=0.42\times0.22$). With respect to the topic of football, the resulting products are 0.47 for Super Bowl ($0.47=0.58\times0.81$), 0.17 for team A ($0.17=0.58\times0.3$), and 0.16 for player Q ($0.16=0.58\times0.28$). If the predetermined threshold is 0.2, the Democratic National Convention (0.32), the NSA (0.20), and the Super Bowl (0.47) are selected for inclusion in the subset because they all have products that equal or exceed 0.2.

In the examples discussed above, it has been assumed that no two topics of interest have the same trending entity. In other words, it has been assumed that a trending entity exists only within one topic of interest. However, it is possible for the same trending entity to exists within multiple topics of interest. Moreover, the trending entity may have a different intra-topic weight in each of the multiple topics of interest. In such embodiments, the intra-topic weights may themselves be weighted using the intra-profile weights, and then summed. If the resulting summation satisfies (e.g., equal or exceed) the predetermined threshold, the trending entity is selected for inclusion in the subset.

For example, assume there exists a profile with an interest in two topics: Technology with an intra-profile weight of 0.5, and Startups with an intra-profile weight of 0.3. Moreover, assume the entity "Company Omega" is trending within both the topic of Technology and the topic of Startups. Specifically, "Company Omega" has an intra-topic weight of 0.6 within the topic of Technology, and an intra-topic weight of 0.8 within the topic of Startups. A combined weight for "Company Omega" may be calculated as the sum of the intra-topics weights weighted by the intra-profile weights. In other words, the combined weight for "Company Omega" may be calculated as: (Intra-topic weight for "Company Omega" within topic of Technology)×(Intra-profile weight for topic of Technology)+(Intra-topic weight for "Company Omega" within topic of Startups)×(Intra-profile weight for topic of Startups)=$(0.6)\times(0.5)+(0.8)\times(0.3)=0.54$. If, like in the example above, the predetermined threshold is 0.2, "Company Omega" is selected for inclusion in the subset because its combined weight satisfies (e.g., equal or exceed) the predetermined threshold.

In one or more embodiments of the invention, selecting a subset of the trending entities includes calculating list sizes for each topic of interest for the selected profile, selecting the top trending entities for each topic of interest up to its corresponding list size, and then ordering the selected trending entities based on products resulting from the multiplication of the intra-profile weights with the intra-topic weights.

For example, assume the selected profile is interested in the topic of technology with an intra-profile weight of 0.8, and is interest in the topic of Canada with an intra-profile weight of 0.2. Further, assume the total number of trending entities in the subset will be limited to 10. A list size of 8 (8=10×0.8) is calculated for the topic of technology, and a list size of 2 (2=10×0.2) is calculated for the topic of Canada. Accordingly, the top 8 trending entities, as established by intra-topic weight, in the topic of technology are selected for inclusion in the subset. Further, the top 2 trending entities, as established by intra-topic weight, in the topic of Canada are selected for inclusion in the subset. The intra-topic weight for each of the 8 technology trending entities is multiplied with the intra-profile weight for technology (i.e., 0.8). The intra-topic weight for each of the 2 Canada trending entities is multiplied with the intra-profile weight for Canada (0.2). The values of these products may dictate the ordering of the trending entities within the subset and the order content associated with the subset is displayed to a user of the profile.

In one or more embodiments of the invention, the trends personalization engine (310) is configured to filter (i.e., exclude, remove, etc.) trending entities based on attributes of the selected profile. For example, the trends personalization engine (310) may filter trending entities that are associated with geographic locations outside the geographic region affiliated with the selected profile. As another example, the trends personalization engine (310) may filter trending entities that are not in the same language as the language affiliated with the selected profile. Both geographic region and language are example attributes of the selected profile. The filter(s) may be applied at any time. For example, the filter(s) may be applied before trending entities are selected for inclusion within the subset. Additionally or alternatively, the filter(s) may be applied to trending entities within the subset.

In one or more embodiments of the invention, the trends module (399) includes the trending engine (308). The trending engine (308) is configured to identify entities from messages issued by profiles (i.e., accounts) of the social networking application (i.e., messaging platform), map the entities to one or more topics, and then calculate an intra-topic weight for the entity. If the intra-topic weight satisfies a threshold and/or ranks highly in comparison to other intra-topic weights, the entity may be designated a trending entity within the topic. Each of these functionalities is discussed below.

In one or more embodiments of the invention, when a profile issues a message, the trends module (308) identifies one or more entities in the message by parsing the message. An entity may correspond to a capitalized word in the message, a capitalized phrase in the message, a string following a special character (e.g., #, $, @, etc.), etc.

In one or more embodiments of the invention, when a profile issues a message, the trend module (308) determines the topic(s) the profile is known for by accessing the topic repository (138). The message may be classified as pertaining to each of the topics the profile is known for and any identified entities may be mapped to each topic the profile is known for. As discussed above, although a profile may be known for multiple topics, the profile mostly likely has a different expert weight for each topic. When an extracted entity is mapped to a topic, the expert weight for the topic is assigned to the mapped entity.

Consider the following example. Assume the entity "Brazil" appears in messages issues by 1000 profiles. Of these profiles, 70% are interested in (or known for) the topic of "Sports", 20% are interested in (or known for) the topic of "South America", and 10% are interested in (or known for) the topic of "Politics." As a result, the entity "Brazil" is assigned an intra-topic weight of 0.7 for "Sports", an intra-topic weight 0.2 for "South America", and an intra-topic weight of 0.1 for "Politics".

As another example, assume the entity "BrazilLost" appears in messages issued by 3 profiles. The first profile is interested in (or known for) the topic of "Sports" with an intra-profile weight of 0.6, and the topic of "Politics" with as intra-profile weight of 0.4. The second profile is interested in (or known for) the topic of "Sports" with an intra-profile weight of 0.8, and the topic of "Travel" with an intra-profile weight of 0.2. The third profile is interested in (or known for) the topic of "Politics" with an intra-profile weight of 1.0. Summing results in a total of 0.6+0.8=1.4 for "Sports", 0.4+1.0=1.4 for "Politics", and 0.2 for "Travel". Then divide these sums by 3 to get the intra-topic weights. Accordingly, the entity "BrazilLost" has an intra-topic weight of 0.47 within the topic of "Sports", an intra-topic weight of 0.47 within the topic of "Politics", and an intra-topic weight of 0.066 within the topic of "Travel."

In one or more embodiments of the invention, the trending engine (308) includes a frequency counter for each entity within each topic. When an entity is extracted from the message and assigned to the topic, the corresponding counter for the entity is incremented. In one or more embodiments of the invention, the trending engine (308) calculates an intra-topic weight for the entity using a function that inputs a historical baseline for the entity, the current value of the frequency counter for the entity, and the expert weight(s) assigned to the entity. The trending entities and their intra-tropic weights may be stored in the trend repository (140) (discussed above).

In one or more embodiments of the invention, topic repository (138) stores messages that have been classified (e.g., by the trending engine (308)) as pertaining to one or more topics. For example, as shown in the topic repository (138), messages A1, A2, and A3 have been classified as pertaining to topic A. Similarly, messages B1, B2, and B3 have been classified as pertaining to topic B. When the trending engine (308) classifies a message as pertaining to a topic, it is added to the set of messages in the topic repository (138) pertaining to the topic. Messages in the topic repository (138) that are heavily forwarded by profiles (i.e., popular messages) may be marked/flagged.

In one or more embodiments of the invention, the trends module (399) includes a whitelist (312). The whitelist (312) may correspond to a list, an array, a database, a flat file, or a data structure of any type. The whitelist (312) stores the identities of domains (e.g., web sites) that are considered to have safe content. Safe content may include content (e.g., news stories, images, etc.) that is free from viruses, objectionable/obscene material, etc. Domains may be added to the whitelist (312) and/or removed from the whitelist (312) at any time.

In one or more embodiments of the invention, the trends module (399) includes a search engine (314). The search engine (314) is configured to obtain a trending entity within a topic of interest for a profile; access messages classified as pertaining to the topic of interest; retrieve messages corresponding to the trending entity; and send (e.g., in a stream) content associated with the trending entity to the profile for display to a user of the profile. Each of these functionalities is discussed below.

In one or more embodiments of the invention, the search engine (314) is configured to obtain a trending entity for a profile. The trending entity may have already been selected by the trends personalization engine (310). As discussed above, the trending entity belongs to a topic of interest for the profile.

In one or more embodiments of the invention, the search engine (314) is configured to retrieve a subset of messages corresponding to the trending entity. Specifically, the search engine (314) may access the messages in the topic repository (138) that have been classified as pertaining to the topic of interest. The search engine (314) may parse these messages in search of the subset of messages containing the trending entity. The identifiers for these messages may be added to the message stream for the profile (discussed above in reference to FIG. 1). In other words, these messages are part of the content sent for display to a user of the profile.

In one or more embodiments of the invention, messages that are associated with geographic locations outside the geographic region affiliated with the profile are excluded from the search (i.e., not parsed). In one or more embodiments of the invention, messages that do not satisfy a traffic criterion (i.e., messages not flagged as popular/heavily forwarded) are excluded from the search (i.e. not parsed).

In one or more embodiments of the invention, the search engine (314) parses messages within the subset to identify links to news stories or images and the source(s) of the links. The search engine (314) may compare the source(s) against the entries in the whitelist repository. If a match is successful, the links to the images and the news stories (or the actual images and news stories) may be added to the message stream for the profile. In other words, these links are part of the content sent for display to a user of the profile.

Although the trends module (399) has been describe as having a set of components each with specific functionality, those skilled in the art, having the benefit of this detailed description, will appreciate that the arrangement of the components and the distribution of functionality may differ among embodiments of the invention.

Figure 4:
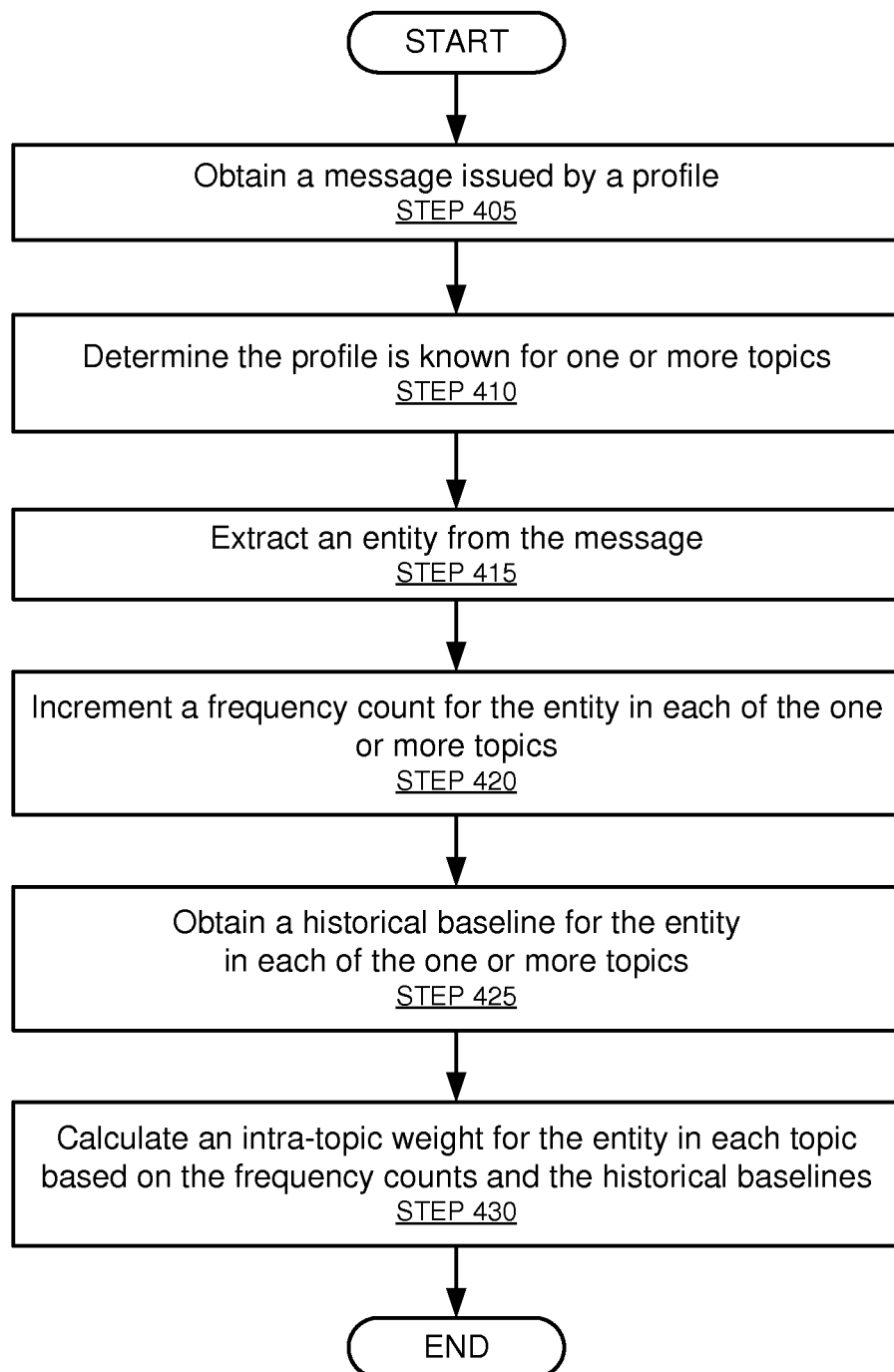
FIGS. 4-7 show flowcharts in accordance with one or more embodiments of the invention.

FIG. 4 shows a flowchart in accordance with one or more embodiments of the invention. The process shown in FIG. 4 may be executed, for example, by one or more components (e.g., trending engine (308), topic repository (138), etc.) discussed above in reference to FIG. 3. One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, a message is obtained (STEP 405). The message is issued by a profile within the messaging platform. The message may be of any size and written in any language. The message may include metadata with a geographic location associated with the profile. The message may include text, images, and/or links to news stories and images.

In STEP 410, it is determined the profile is known for one or more topics. Specifically, some profiles in the messaging platform are known for certain topics. Historically, these profiles may have issued a significant number/volume of messages regarding one or more topics. Moreover, the messages issued by these profiles may have been forwarded repeatedly to other users in the messaging platform. The topic(s) that the profile is "known for" may be determined by accessing a repository storing the mappings between profiles and the topics the profiles are known for. Moreover, the repository may also store an expert weight for each topic that the profile is known for. The expert weight is effectively a measurement as to what degree the profile is known for the topic. The message may be classified as pertaining to each of the topics the profile is known for.

In STEP 415, an entity is extracted from the message. The entity may be identified in the message by parsing the message. Specifically, the entity may correspond to a word with all capital letters, a sequence of words that are all capitalized, a string following a special character (e.g., #, $, @), etc.

In STEP 420, a frequency count for the entity in each of the one or more topics is incremented. In one or more embodiments, the frequency count is maintained using a set of counters. These counters may be reset according to any schedule (e.g., hourly, daily, weekly, etc.).

In STEP 425, a historical baseline for the entity in each of the one or more topics is obtained. The historical baseline is effectively a reference frequency count against which to measure the frequency count of STEP 420. The reference frequency count may be updated/re-calculated according to any schedule (e.g., daily, quarterly, yearly, etc.).

In STEP 430, an intra-topic weight is calculated for the entity in each topic. The intra-topic weight is a function of the historical baseline for the entity in the topic, the frequency count for the entity in the topic, and the expert weight of the profile for the topic. Entities with large intra-topic weights may be designated as trending entities. Those skilled in the art, having the benefits of this detailed description, will appreciate that use of the historical baseline prevents entities with continuously high frequency counts from continuously being designated as trending entities.

Figure 5:
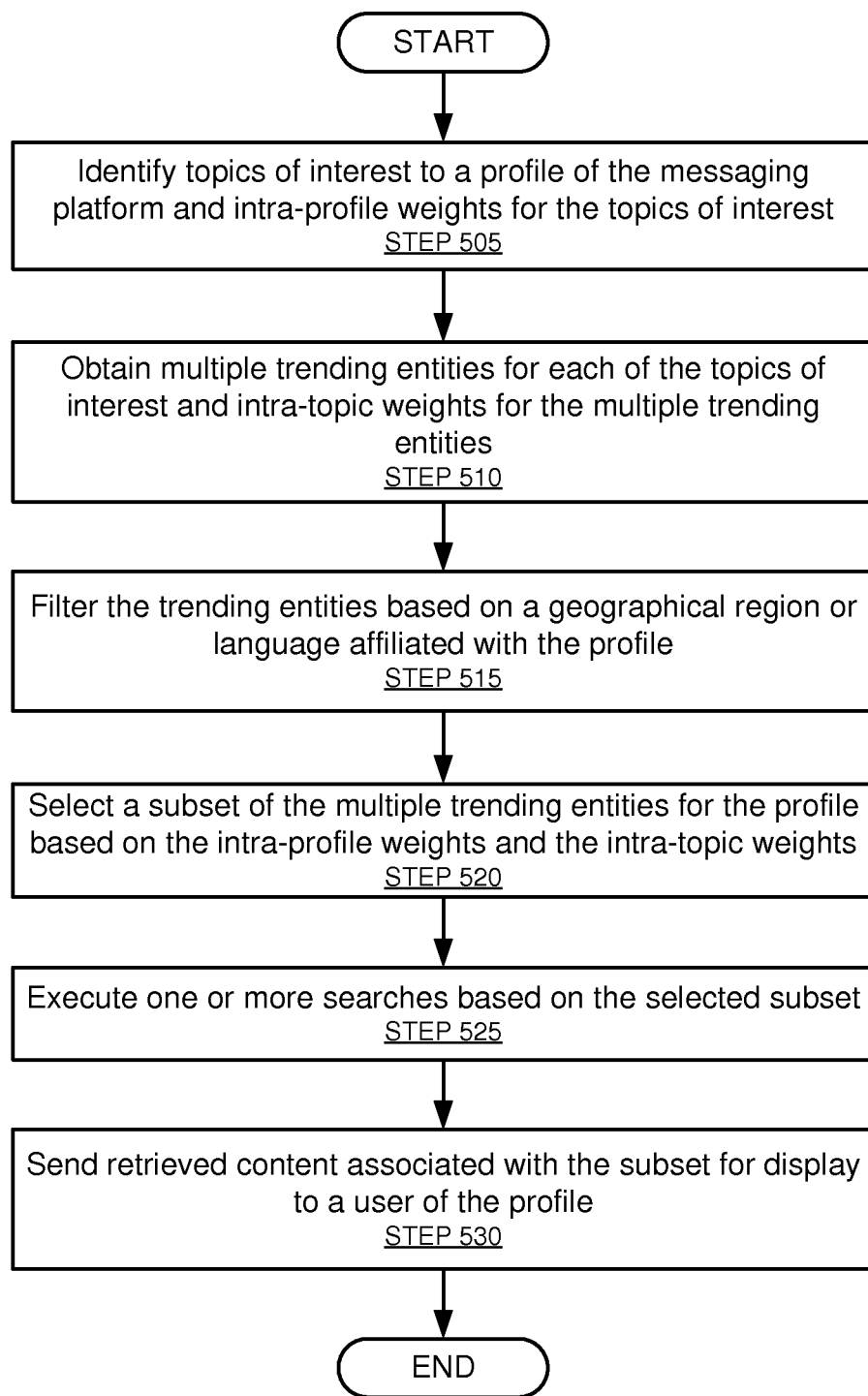

FIG. 5 shows a flowchart in accordance with one or more embodiments of the invention. The process shown in FIG. 5 may be executed, for example, by one or more components (e.g., trends personalization engine (310), topic repository (138), trends repository (140), etc.) discussed above in reference to FIG. 3. One or more steps shown in FIG. 5 may be omitted, repeated, and/or performed in a different order among different embodiments of the invention. Accordingly, embodiments of the invention should not be considered limited to the specific number and arrangement of steps shown in FIG. 5. In one or more embodiments of the invention, the process shown in FIG. 5 occurs after the process shown in FIG. 4.

Initially, topics of interest to a profile and the intra-profile weights for the topics of interest are identified (STEP 505). In one or more embodiments of the invention, the topics of interest are identified first by discovering profiles that are followed by the profile, and then identifying the topics that the discovered profiles are known for. For example, assume profile A follows profile B and follows profile C. Moreover, assume profile B is known for the topic of San Francisco, and profile C is known for the topic of jazz music. It may be determined that profile A is interested the topic of San Francisco and the topic of jazz music because profile A follows profiles that are known for the topics of San Francisco and jazz music.

In one or more embodiments of the invention, an intra-profile weight is calculated for each topic of interest. The intra-profile weight for each topic of interest may be calculated based on numerous factors including: the number of profiles followed by the selected profile that are known for the topic of interest; the expert weight each followed profile has for the topic of interest; the number of messages associated with the topic of interest that are issued or forwarded by the selected profile, etc.

In STEP 510, multiple trending entities for each of the identified topics of interest and the intra-topic weight for each of the trending entities are obtained. Specifically, the trending entities and their corresponding intra-topic weights may be obtained from a repository.

In STEP 515, the trending entities are filtered based on a geographical region affiliated with the profile. Specifically, trending entities associated with geographical locations that fall outside of the geographical region may be removed/excluded from consideration. Other attributes of the profile may be used to filter the trending entities. For example, language preferences of the profile may be used to filter trending entities. Those skilled in the art, having the benefit of this detailed description, will appreciate that STEP 515 is optional.

Figure 6:
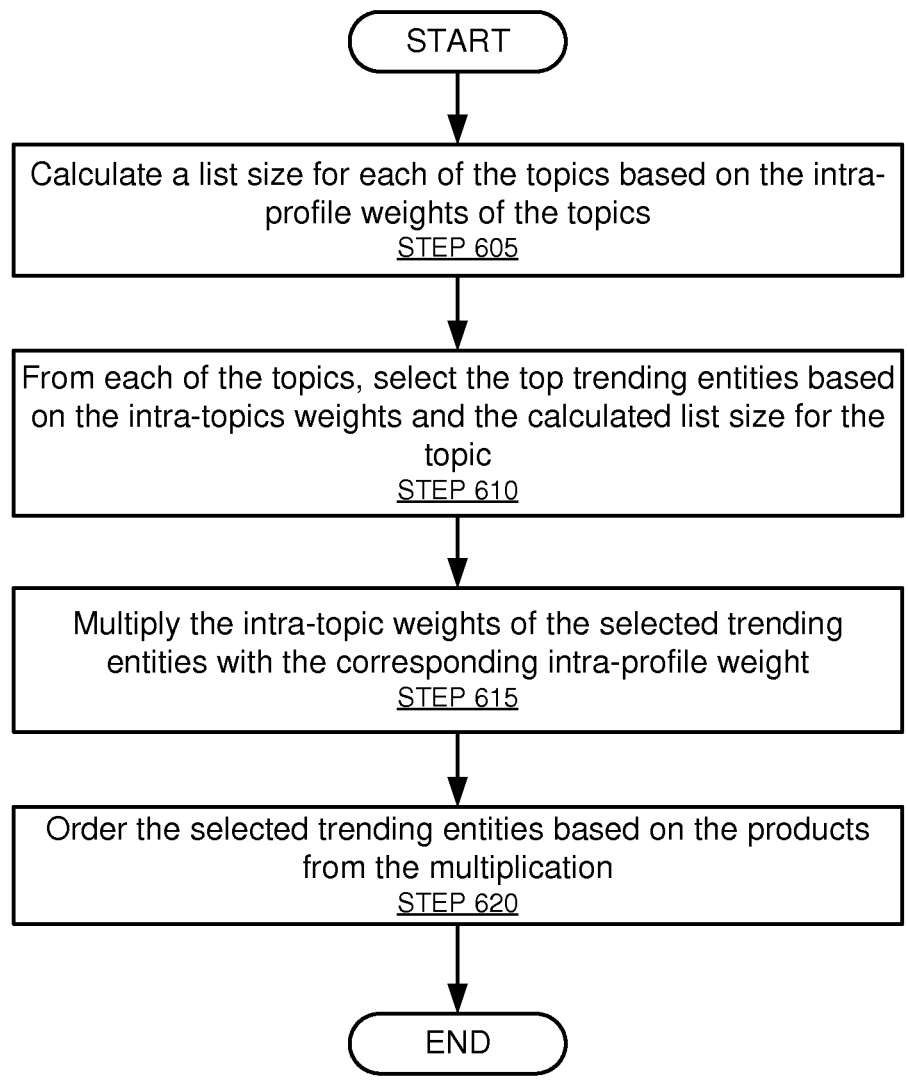

In STEP 520, a subset of the trending entities is selected based on the intra-profile weights and the intra-topics weights. Numerous algorithms exist to select the subset of trending entities for the profile. In one or more embodiments of the invention, selecting a subset of the trending entities includes multiplying the intra-profile weight for the topic of interest with the intra-topic weight of each trending entity within the topic of interest. This is done for all topics of interest for the selected profile. The products resulting from these multiplications are compared with a predetermined threshold. The trending entities having products that satisfy (e.g., equal or exceed) the predetermined threshold are selected for inclusion in the subset. FIG. 6 discusses an additional/alternative method for selecting the subset of trending entities.

In STEP 525, one or more searches are performed based on the selected subset of trending entities. STEP 525 is described below in reference to FIG. 7. In STEP 230, the retrieved content is sent for display to a user of the profile. The retrieved content may include the messages of the subset and/or links to images or news stories (discussed below). The retrieved content may be inserted into the message stream for the profile.

FIG. 6 shows a flowchart in accordance with one or more embodiments of the invention. The process shown in FIG. 6 may be executed, for example, by one or more components (e.g., trending engine (308), topic repository (138), etc.) discussed above in reference to FIG. 3. One or more steps shown in FIG. 6 may be omitted, repeated, and/or performed in a different order among different embodiments of the invention. Accordingly, embodiments of the invention should not be considered limited to the specific number and arrangement of steps shown in FIG. 6. In one or more embodiments of the invention, the process in FIG. 6 corresponds to STEP 520 in FIG. 5.

Initially, a list size is calculated for each topic of interest for the selected profile (STEP 605). Specifically, the list size for a topic of interest is calculated based on the intra-profile weight for the topic of interest and the upper limit of trending entities in the subset. For example, assume the selected profile is interested in the topic of technology with an intra-profile weight of 0.8, and is interest in the topic of Canada with an intra-profile weight of 0.2. Further, assume the total number of trending entities in the subset will be limited to 10 (i.e., upper limit=10). A list size of 8 (8=10× 0.8) is calculated for the topic of technology, and a list size of 2 (2=10×0.2) is calculated for the topic of Canada.

In STEP 610, the top trending entities are selected from each of the topics of interest. Specifically, the top trending entities for each topic of interest up to its corresponding list size are selected. Still referring to the example mentioned in STEP 605, the top 8 trending entities, as established by intra-topic weight, in the topic of technology are selected for inclusion in the subset. Further, the top 2 trending entities, as established by intra-topic weight, in the topic of Canada are selected for inclusion in the subset.

In STEP 615, the intra-topic weight of each of the trending entities is multiplied with its corresponding intra-profile weight. Still referring to the example of STEP 605 and 610, the intra-topic weight for each of the 8 technology trending entities is multiplied with the intra-profile weight for technology (i.e., 0.8). The intra-topic weight for each of the 2 Canada trending entities is multiplied with the intra-profile weight for Canada (0.2). The values of these products may dictate the ordering of the trending entities within the subset (STEP 620), and the order retrieved content is displayed to a user of the profile.

Figure 7:
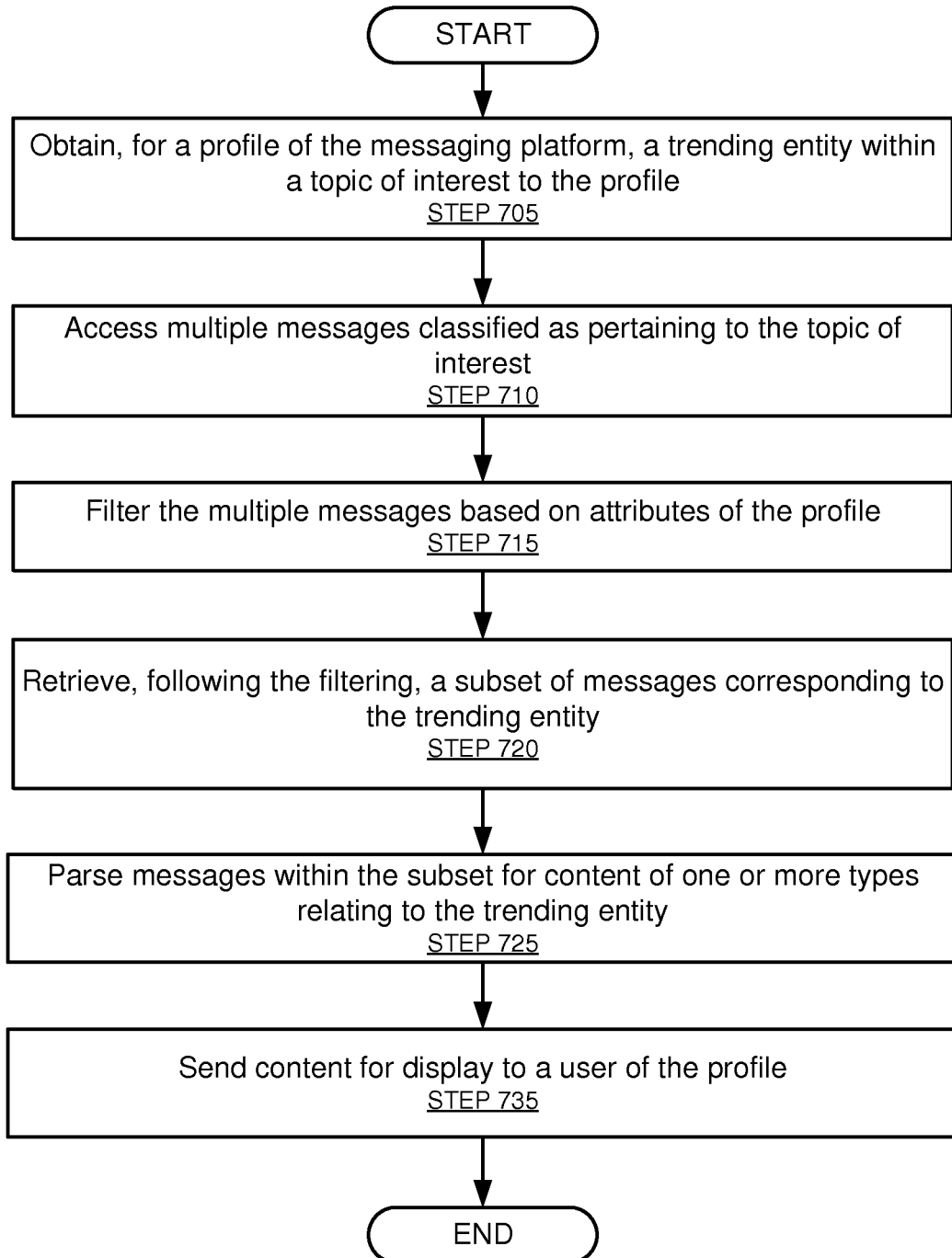

FIG. 7 shows a flowchart in accordance with one or more embodiments of the invention. The process shown in FIG. 7 may be executed, for example, by one or more components (e.g., search engine (314), etc.) discussed above in reference to FIG. 3. One or more steps shown in FIG. 7 may be omitted, repeated, and/or performed in a different order among different embodiments of the invention. Accordingly, embodiments of the invention should not be considered limited to the specific number and arrangement of steps shown in FIG. 7. In one or more embodiments of the invention, the process in FIG. 7 corresponds to STEP 525 in FIG. 5. Additionally or alternatively, the process of FIG. 7 may be executed independently of the process of FIG. 5.

Initially, a trending entity is obtained for a profile (STEP 705). The entity is determined to be trending within a topic of interest for the profile. In STEP 710, messages that have been classified as pertaining to the topic of interest are accessed. The messages may be stored in a repository (e.g., topic repository (138), discussed above in reference to FIG. 1 and FIG. 3).

In STEP 715, the messages may be filtered according to attributes of the profile. For example, the profile may be affiliated with a geographic region and/or a language. Messages associated with geographic locations that fall outside the geographic region and/or messages that are written in a language other than the language affiliated with the profile may be filtered (i.e., excluded, removed) from additional consideration. Those skilled in the art, having the benefit of this detailed description, will appreciate that STEP 715 is optional and/or that other types attribute filtering is also possible.

In STEP 720, the messages that pass the filtering (i.e., messages that have the desired attributes) are searched and a subset of messages corresponding to the trending entity is retrieved. Searching the messages may include parsing the messages to identify the presence of the trending entity. In one or more embodiments of the invention, messages that do not satisfy a traffic criterion (i.e., messages not flagged as popular/heavily forwarded) are excluded from the search (i.e. not parsed).

In STEP 725, the messages in the subset are parsed for content of one or more types (e.g., images, links to news stories, etc.) relating to the trending entity. The sources of the content may be compared against white listed domains. If there is a match (i.e., the identified content comes from a source that is known to be safe), the content (i.e., images, links to news stories, etc.) and/or the messages having the content are added to the stream (discussed above in reference to the stream repository (144) of FIG. 1) to be sent to the profile for viewing by a user (STEP 735).

Those skilled in the art, having the benefit of this detailed description, will appreciate that the process of FIG. 7 may be repeated for all trending entities that have been selected for the profile. Accordingly, the user of the profile will view content reflecting trending entities that are of interest to the user.

Social networks and/or messaging platforms of the art, prior to this disclosure, generally require a user to manually select content (e.g., messages, pictures, news stories, etc.) that is of interest to the user. Considering the sheer volume of content that is available within social networks and/or messaging platforms, this task can be overwhelming and easily leads to situations where content that is of interest to a user is missed by the user. In contrast, one or more embodiments of the invention described herein identifies topics of interest to the user and trending entities within each of the topics. Content relating to the trending entities can be mined and presented to the user, reducing the burden on the user and reducing the likelihood of the user of missing content that would be of interest. Moreover, embodiments of the invention may have one or more of the following advantages: the ability to identify topics of interest to a profile in a messaging platform; the ability to identifying trending entities within a topic of interest; the ability to select a subset of trending entities for a profile; the ability to assign intra-topic weights and intra-profile weights; the ability to search messages for content corresponding to trending entities for a profile; the ability to filter messages and/or trending entities based on attributes of a profile including geographic location and/or language; the ability to map a message to a topic based on the profile that issued the message and the topic(s) the profile is known for; etc.

Figure 8:
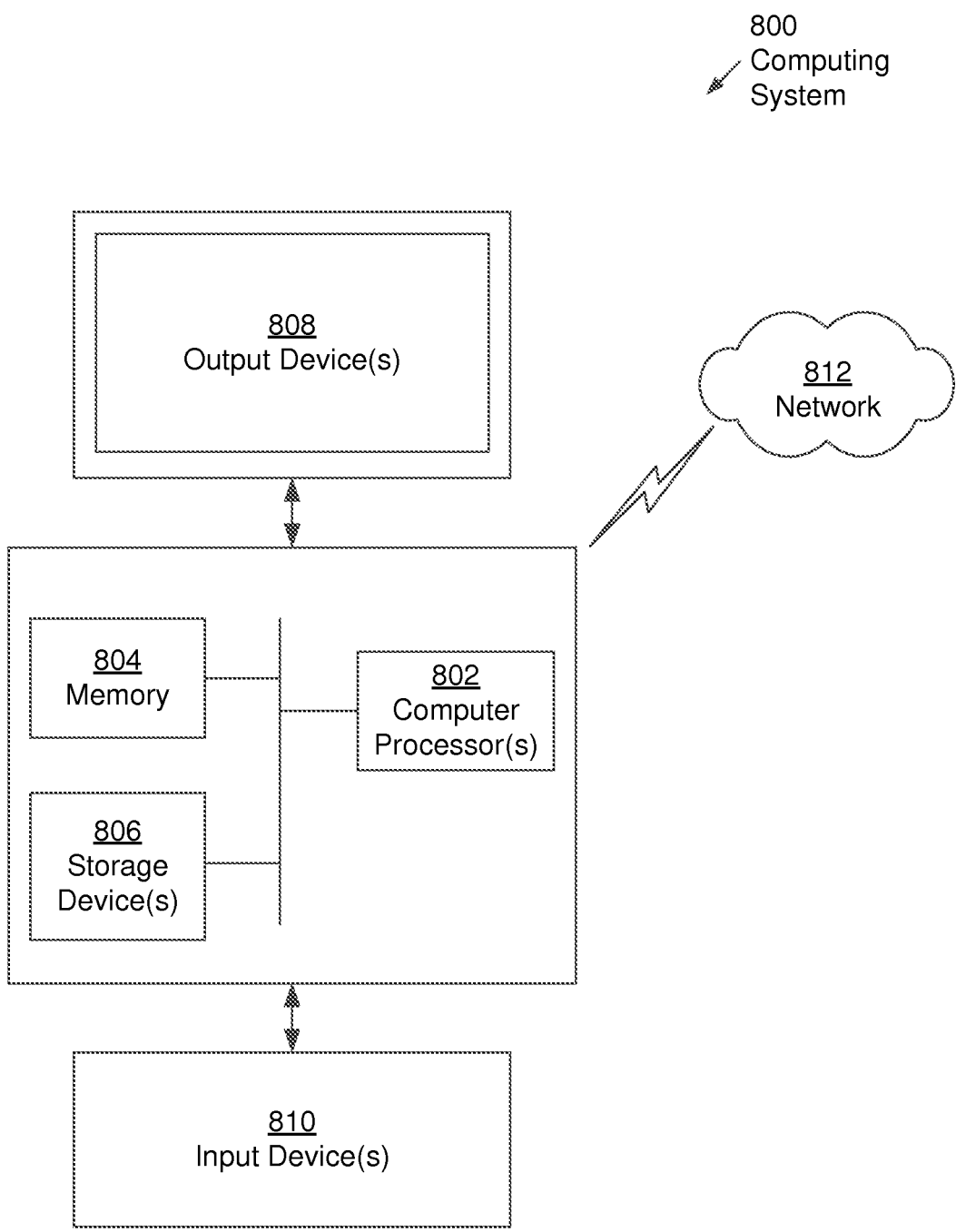
FIG. 8 shows a computer system in accordance with one or more embodiments of the invention.

FIG. 8 shows a computing system (800) in accordance with one or more embodiments of the invention. The computing system (800) may be one or more mobile devices (e.g., laptop computer, smart phone, personal digital assistant, tablet computer), desktop computers, servers, blades in a server chassis, etc. In one or more embodiments of the invention, the trends module (399) is implemented on the computer system (800). In one or more embodiments, at least one of the trending engine (308) and the trends personalization engine (310) is implemented on the computer system (800). The computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (814) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806).

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (800) may be located at a remote location and connected to the other elements over a network (814). Further, various components (e.g., trends module (399)) may be implemented on a distributed system having a plurality of nodes, where each portion of the component may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of operating a messaging platform, comprising:

obtaining, for a first profile of the messaging platform, a first topic of interest, a first intra-profile (IP) weight for the first topic of interest, a second topic of interest, and a second IP weight for the second topic of interest, wherein each IP weight indicates a degree of interest the first profile has in the respective topic, and the first IP weight is different from the second IP weight;

obtaining a first plurality of trending entities for the first topic of interest and a second plurality of trending entities for the second topic of interest, wherein a trending entity for a particular topic of interest is an entity with a calculated intra-topic weight for the particular topic of interest that satisfies a threshold and wherein obtaining trending entities for a particular topic of interest comprises:

obtaining a plurality of entities and calculating an intra-topic (IT) weight for the particular topic for each of the obtained plurality of entities, wherein for each entity, the IT weight for a particular topic indicates a degree to which the entity is trending within the particular topic, the IT weight of the entity is calculated for the particular topic based on a current value of a frequency counter for the entity with respect to the particular topic relative to a historical baseline for occurrence of the entity with respect to the particular topic, and wherein each entity having a calculated IT weight that satisfies the threshold is designated as a trending entity for the particular topic;

selecting a combined subset of entities from the first plurality of trending entities and the second plurality of trending entities using the first IP weight, the second IP weight, the first plurality of IT weights, and the second plurality of IT weights, wherein whether a particular entity for a particular topic is included in the combined subset is determined using the IT weight of the particular entity for the particular topic and the IP weight for the particular topic;

identifying content associated with the entities in the combined subset of entities; and sending the identified content for display to a user of the first profile.

2. The method of claim 1, further comprising:

executing a search on contents posted on the messaging platform by using entities in the combined subset of entities that are selected from the first plurality of trending entities and the second plurality of trending entities, as search criteria;

wherein sending the identified content comprises sending a plurality of results from the search for display to the user.

3. The method of claim 1, wherein obtaining the first topic of interest and the second topic of interest comprises:

identifying followed profiles that the user of the first profile is following, each followed profile of the identified follow profile having respective expert weights that represent degrees of expertise of the followed profile in respective topics based on content of messages broadcast by the followed profile;

determining that a second profile of the followed profiles is known for the first topic of interest based on an expert weight for the first topic of interest; and determining that a third profile of the followed profiles is known for the second topic of interest based on an expert weight for the second topic of interest.

4. The method of claim 1, wherein selecting the combined subset of entities from the first plurality of trending entities and the second plurality of trending entities comprises:

calculating a plurality of products, each product of the plurality of products being associated with at least one of the first plurality of trending entities and the second plurality of trending entities by:

multiplying each of the first plurality of IT weights with the first IP weight; and multiplying each of the second plurality of IT weights with the second IP weight; and identifying a subset of the plurality of products comprising products that are in excess of a predetermined threshold, wherein the combined subset of entities includes entities that corresponds to at least one product in the subset of the plurality of products.

5. The method of claim 1, wherein selecting the combined subset of entities from the first plurality of trending entities and the second plurality of trending entities comprises:

calculating a first list size N based on the first IP weight and a second list size M based on the second IP weight, wherein the first IP weight is greater than the second IP weight and N is greater than M;

identifying a top N trending entities of the first plurality of trending entities based on the first plurality of IT weights; and identifying a top M trending entities of the second plurality of trending entities based on the second plurality of IT weights, wherein the subset of the first plurality of trending entities and the second plurality of trending entities corresponds to the top N trending entities and the top M trending entities.

6. The method of claim 5, further comprising:

calculating a plurality of products by:

multiplying the first IP weight with each IT weight of the top N trending entities; and multiplying the second IP weight with each IT weight of the top M trending entities; and ordering the subset according to the plurality of products.

7. The method of claim 1, further comprising:

identifying a geographic region affiliated with the first profile; and filtering, before selecting the combined subset of entities, the first plurality of trending entities to exclude a trending entity associated with a geographical location outside the geographic region.

8. The method of claim 1, wherein the first topic is a geographic location.

9. The method of claim 1, further comprising:

obtaining a message from a second profile of the messaging platform;

determining the second profile is known for one or more topics by accessing a repository that stores mappings between profiles and topics each profile is known for;

extracting an entity from the message;

incrementing a first frequency count for the entity in each of the one or more topics;

obtaining a first historical baseline for the entity in each of the one or more topics; and calculating an IT weight for the entity in each of the one or more topics, wherein an IT weight for the entity for a topic is calculated based on a respective first frequency count and a respective historical baseline for the entity in the topic.

10. The method of claim 1, wherein in the combined subset of entities, the number of entities selected from the first plurality of trending entities relative to the number of entities selected from the second plurality of trending entities corresponds to the first IP weight relative to the second IP weight.

11. A messaging platform system comprising:

a processor;

a topic repository storing:

mappings between a first topic and a first profile of the messaging platform; and mapping between a second topic and the first profile;

a trends repository storing:

a first plurality of trending entities obtained for the first topic and a second plurality of trending entities for the second topic, wherein a trending entity for a particular topic is an entity with a calculated topic weight for the particular topic that satisfies a threshold and wherein obtaining trending entities for a particular topic comprises:

obtaining a plurality of entities and calculating an intra-topic (IT) weight for the particular topic each of the obtained plurality of entities, wherein for each entity, the IT weight for a particular topic indicates a degree to which the entity is trending within the particular topic, the IT weight of the entity is calculated for the particular topic based on a current value of a frequency counter for the entity with respect to the particular topic relative to a historical baseline for occurrence of the entity with respect to the particular topic, and
wherein each entity having a calculated IT weight that satisfies the threshold is designated as a trending entity for the particular topic; and
a trends personalization engine executing on the processor and configured to:
determine, by accessing the topic repository, that the first profile is interested in the first topic and in the second topic;
obtain, for the first profile, a first intra-profile (IP) weight for the first topic and a second IP weight for the second topic, wherein each IP weight indicates a degree of interest the first profile has in the respective topic, and the first IP weight is different from the second IP weight;
select, for the first profile, a combined subset of entities from the first plurality of trending entities and the second plurality of trending entities using the first IP weight, the second IP weight, the first plurality of IT weights, and the second plurality of IT weights, wherein whether a particular entity for a particular topic is included in the combined subset is determined using the IT weight of the particular entity for the particular topic and the IP weight for the particular topic;
identify content associated with the entities in the combined subset of entities; and
send the identified content for display to a user of the first profile.

12. The messaging platform system of claim 11, further comprising:
a trending engine comprising a first frequency counter and configured to:
obtain a message from a second profile of the messaging platform;
determine, by accessing the topic repository, that the second profile is known for one or more topics by accessing a repository that stores mappings between profiles and topics each profile is known for;
extract an entity from the message;
increment a first frequency count for the entity in each of the one or more topics;
obtain a first historical baseline for the entity in each of the one or more topics; and
calculate a first IT weight for the entity in each of the one or more topics, wherein a first IT weight for the entity for a topic is calculated based on a respective first frequency count and a respective historical baseline for the entity in the topic.

13. The messaging platform system of claim 11, wherein the first topic is a geographical location.

14. The messaging platform system of claim 11, wherein in the combined subset of entities, the number of entities selected from the first plurality of trending entities relative to the number of entities selected from the second plurality of trending entities corresponds to the first IP weight relative to the second IP weight.

15. A non-transitory computer readable medium (CRM) storing a plurality of instructions for operating a messaging platform, the instructions comprising functionality for:
obtaining, for a first profile of the messaging platform, a first topic of interest, a first intra-profile (IP) weight for the first topic of interest, a second topic of interest, and a second IP weight for the second topic of interest, wherein each IP weight indicates a degree of interest the first profile has in the respective topic, and the first IP weight is different from the second IP weight;
obtaining a first plurality of trending entities for the first topic of interest and a second plurality of trending entities for the second topic of interest, wherein a trending entity for a particular topic of interest is an entity with a calculated intra-topic weight for the particular topic of interest that satisfies a threshold and wherein obtaining trending entities for a particular topic of interest comprises:
obtaining a plurality of entities and calculating an intra-topic (IT) weight for the particular topic for each of the obtained plurality of entities,
wherein for each entity, the IT weight for a particular topic of interest indicates a degree to which the entity is trending within the particular topic, the IT weight of the entity is calculated for the particular topic based on a current value of a frequency counter for the entity with respect to the particular topic relative to a historical baseline for occurrence of the entity with respect to the particular topic, and
wherein each entity having a calculated IT weight that satisfies the threshold is designated as a trending entity for the particular topic;
selecting a combined subset of entities from the first plurality of trending entities and the second plurality of trending entities using the first IP weight, the second IP weight, the first plurality of IT weights, and the second plurality of IT weights, wherein whether a particular entity for a particular topic is included in the combined subset is determined using the IT weight of the particular entity for the particular topic and the IP weight for the particular topic;
identifying content associated with the entities in the combined subset of entities; and
sending the identified content for display to a user of the first profile.

16. The non-transitory CRM of claim 15, wherein the instructions for obtaining the first topic of interest and the second topic of interest comprise functionality for:
identifying followed profiles that the user of the first profile is following, each followed profile of the identified followed profiles having respective expert weights that represent degrees of expertise of the followed profile in respective topics based on content of messages broadcast by the followed profile;
determining that a second profile of the followed profile is known for the first topic based on an expert weight for the first topic; and
determining that a third profile of the followed profiles is known for the second topic based on an expert weight for the second topic.

17. The non-transitory CRM of claim 15, wherein the instructions for selecting the combined subset of the first plurality of trending entities and the second plurality of trending entities comprise functionality for:
calculating a first list size N based on the first IP weight and a second list size M based on the second IP weight wherein the first IP weight is greater than the second IP weight and N is greater than M,
identifying a top N trending entities of the first plurality of trending entities based on the first plurality of IT weights; and
identifying a top M trending entities of the second plurality of trending entities based on the second plurality of IT weights, wherein the subset of the first plurality of trending entities and the second plurality of trending entities corresponds to the top N trending entities and the top M trending entities.

18. The non-transitory CRM of claim 15, the instructions further comprising functionality for:
   identifying a geographic region affiliated with the first profile; and
   filtering, before selecting the combined subset of entities, the first plurality of trending entities to exclude a trending entity associated with a geographical location outside the geographic region.

19. The non-transitory CRM of claim 15, the instructions further comprising functionality for:
   obtaining a message from a second profile of the messaging platform;
   determining the second profile is known for one or more topics by accessing a repository that stores mappings between profiles and topics each profile is known for;
   extracting an entity from the message;
   incrementing a first frequency count for the entity in each of the one or more topics;
   obtaining a first historical baseline for the entity in each of the one or more topics; and
   calculating a first IT weight for the entity in each of the one or more topics, wherein a first IT weight for the entity for a topic is calculated based on a respective first frequency count and a respective first historical baseline for the entity in the topic.

20. The non-transitory CRM of claim 15, wherein in the combined subset of entities, the number of entities selected from the first plurality of trending entities relative to the number of entities selected from the second plurality of trending entities corresponds to the first IP weight relative to the second IP weight.

* * * * *

UNITED STATES PATENT AND TRADEMARK OFFICE
CERTIFICATE OF CORRECTION

PATENT NO. : 10,592,539 B1  
APPLICATION NO. : 14/329771  
DATED : March 17, 2020  
INVENTOR(S) : Rion Langley Snow and Gilad Avraham Mishne Page 1 of 1

It is certified that error appears in the above-identified patent and that said Letters Patent is hereby corrected as shown below:

In the Specification

Column 17, Line 31, Claim 3, delete "follow profile" and insert -- followed profiles --, therefor.

Signed and Sealed this
Twelfth Day of May, 2020

Andrei Iancu
*Director of the United States Patent and Trademark Office*